United States Patent [19]

Long

[11] Patent Number: 4,753,011
[45] Date of Patent: Jun. 28, 1988

[54] HAND OPERATED METAL SHEAR

[76] Inventor: Joseph F. Long, 8912 Laurel Grove, Austin, Tex. 78758

[21] Appl. No.: 14,933

[22] Filed: Feb. 13, 1987

[51] Int. Cl.$^4$ .............................................. B26B 13/00
[52] U.S. Cl. .......................................... 30/258; 30/257
[58] Field of Search ................... 30/229, 254, 257, 258, 30/259, 260

[56] References Cited

U.S. PATENT DOCUMENTS

| 278,379 | 5/1883 | Webster | 30/258 X |
|---|---|---|---|
| 375,555 | 12/1887 | Loffer | 30/258 X |
| 879,900 | 2/1908 | Potstada | 30/258 X |
| 2,357,197 | 8/1944 | Hood | 30/258 |
| 2,560,673 | 7/1951 | Vosen et al. | 30/257 |
| 4,327,487 | 5/1982 | Brownell | 30/258 X |

FOREIGN PATENT DOCUMENTS 304463 3/1955 Switzerland .......................... 30/258

Primary Examiner—E. R. Kazenske
Assistant Examiner—Michael D. Folkerts

[57] ABSTRACT

An improved hand operated metal shear that removes a strip of metal in small sections with the lower cutter attached to the upper handle by a cylindrical post of lesser diameter than the strip of metal removed so that the shears may be turned sharply to either side without distortion of the metal being cut and with the upper box-like cutter having a curved bottom to facilitate cutting of corrugated metal.

9 Claims, 1 Drawing Sheet

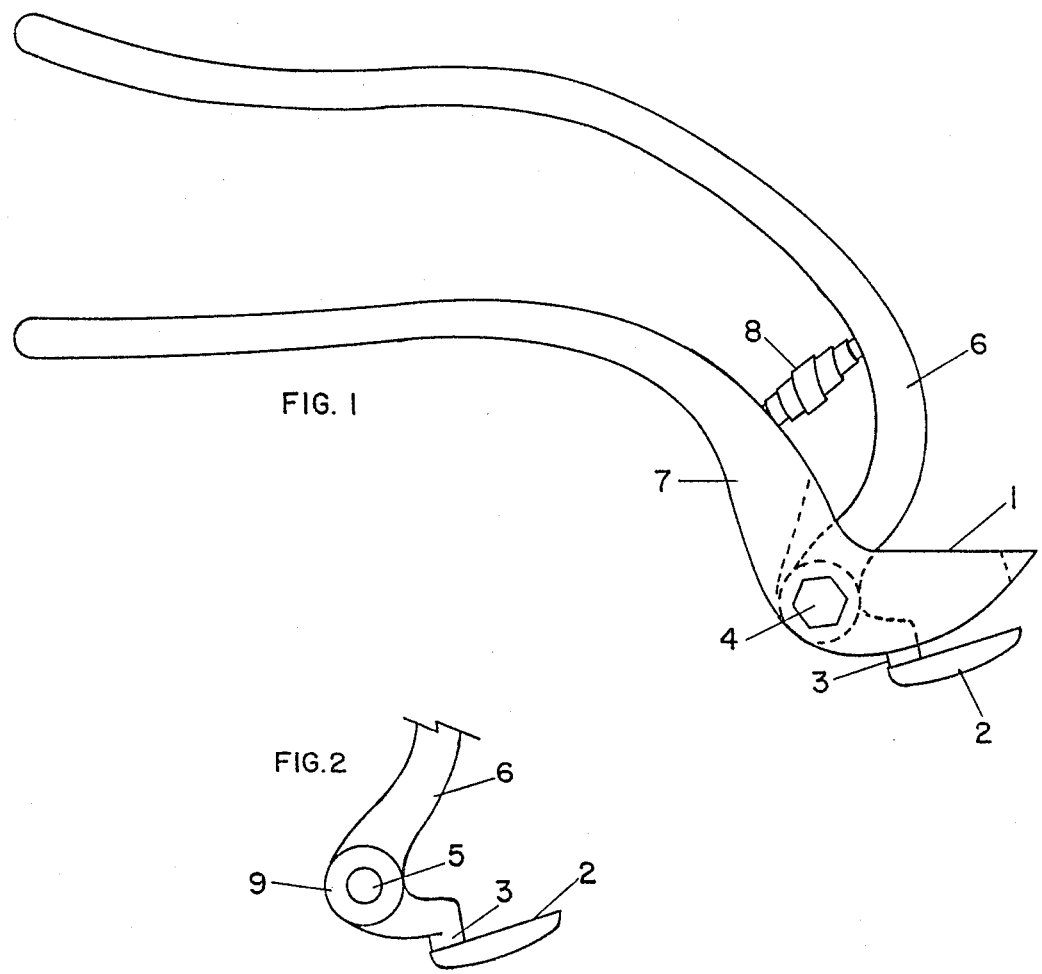
FIG. 1
FIG. 2
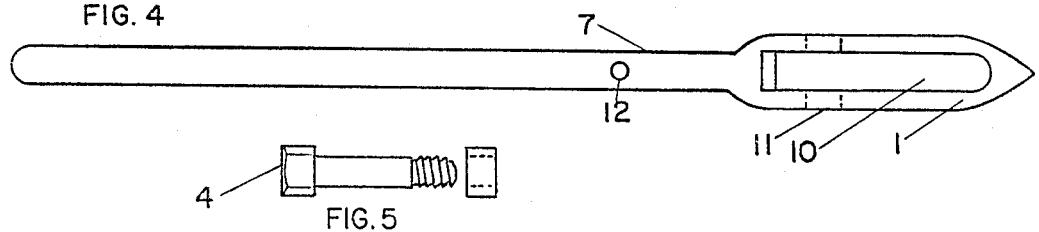
FIG. 4
FIG. 5
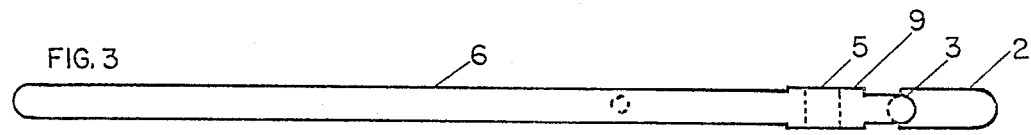
FIG. 3

HAND OPERATED METAL SHEAR

BACKGROUND OF THE INVENTION

This invention pertains to an improved type hand operated metal shear, commonly called snips, that will smoothly cut flat or curved metal such as corrugated roofing.

Present hand operated shears operate to cut metal in much the same way as scissors cut cloth. Problems arise because the rigid metal interferes with forward motion of the shears and cutting along a predetermined line for several feet becomes quite difficult.

Present power driven shears sometimes called "nibblers" overcome the problem with common hand operated shears by removing approximately a one fourth inch wide portion of metal so as to leave approximately $\frac{1}{4}''$ opening for the support shaft of the "nibbler" cutting mechanism to move between the pieces of metal being cut. In general these are too expensive for the normal "once in awhile" use and generally are so shaped as to operate poorly when cutting curved metal such as corrugated roofing.

There is a need for a low cost hand operated metal shear or "snips" that will cut flat or curved metal without the necessity of distorting the metal being cut to accommodate the shear.

There have been attempts to develop such a hand operated metal shear that remove a strip of metal in pieces or as a strip. These did not work as well as the subject invention because of various problems one of which usually was that the mechanism used to remove the metal fit too tightly between the parent metal to allow free movement to cut along a predetermined line. In general they worked only on flat surfaces and for cutting only a short distance.

There is a need for hand operated metal shears that will smoothly:

1. cut flat or curved surfaces;
2. cut straight, cut curving to right or left, or cut out odd shapes such as elliptical shapes;
3. and be low cost and of durable construction.

The invention as described in the following pages, drawings and claims effectively meets these objectives.

We have considered the following patents in this field:

| U.S. Pat. No. | Date | Inventor |
| --- | --- | --- |
| 596,546 | 1898 | W. T. Runyan |
| 1,812,350 | 1931 | F. D. Lingwood |
| 3,362,071 | 1968 | C. C. Schmidt |
| 375,555 | 1887 | S. Loffer |
| 170,658 | 1875 | T. Berridge |
| 2,357,197 | 1943 | A. J. Hoop |

BRIEF DESCRIPTION OF THE INVENTION

In one preferred embodiment the invention comprises four pieces as follows:

1. an upper handle of tool steel of an elliptical cross section with axes approximately $\frac{3}{8}''$ and $\frac{3}{4}''$ and being approximately straight for about 6''; then curving in a semi-circular shape with about a 3'' radius with approximately the lower 2'' of the curved section changing to an oblong cross section approximately $\frac{3}{8}''$ by $\frac{1}{2}''$, fitting into a yoke of a lower handle, containing a hole of approximately $\frac{3}{8}''$ diameter for pinning the upper handle into the yoke of the lower handle with the pin acting as fulcrum. The upper handle then terminating in an L shaped foot turned opposite the semi-curcular curve and attached with a cylindrical post to a hard metal lower cutting member that may be approximately 3/16'' wide approximately $\frac{3}{4}''$ long;
2. a lower handle of tool steel of an elliptical cross section with approximately a $\frac{5}{8}''$ by $\frac{3}{8}''$ axes and being straight for approximately 5''; then curving in a semi-circular shape with about a $1\frac{1}{2}''$ radius for about 3''; then merging into a Y shaped yoke with each side of the yoke having an oblong cross section approximately $\frac{3}{8}'' \times \frac{3}{4}''$ and containing a $\frac{3}{8}''$ hole and attaching at right angles to each side of the upper cutter which is approximately 2'' long and connected at the tip to form a "box"; the "box" so formed having pointed end or square end and rounded bottom and being of a hard metallic composition to form an upper cutting member. This upper cutter being approximately 1/64'' larger than the lower cutting member of the upper handle.
3. a pin which may be $\frac{3}{8}''$ in diameter to connect the upper handle in the yoke of the lower handle;
4. a spring to bias the upper handle and lower handle apart.

In on embodiment A-20 tool steel was used to make the total unit.

Unique features of the present invention include:

1. a box-like upper cutting member with a curved bottom so as to allow both cutters to make solid contact even on a curved surface such as corrugated metal and to provide a continuous cutting action on only a very short section when the lower straight cutting member is moved upward to engage the curved bottom box-like upper cutting member;
2. cutting members so connected to curved handles as to allow cutting normal corrugated metal as well as flat metal by changing position of the shear handles relative to the metal as the shear is used;
3. a lower cutting member that cuts out a larger path than the cylindrical support shank for the lower cutting member thus allowing free movement through the metal being cut;
4. construction from two major wherein the lower cutting member fits through the support for the upper cutting member allowing simple assembly with a pin that acts as a fulcrum as well as holding members in proper in-use relationship;
5. cutting members of hardened tool steel or hardened cutting faces for long life;
6. attachment of the upper handle to the lower cutting member with a cylindrical post which limits the forward motion in use to the length of the lower cutting member. The diameter of the cylindrical post attaching to the lower cutting member is less than the width of the lower cutting member so that the shear may move smoothly either straight forward or in a curved path. For example if the diameter of the cylindrical post is less than $\frac{3}{8}''$ and the lower cutter removes a $\frac{3}{8}''$ wide section the shear may turn sharply to cut out even a small circle if so desired; thus meeting the objective of easily cutting a straight or curved path.

In a second embodiment of this invention the lower cutting member is slightly shorter than the upper cutting member so that in use a strip rolls up ahead of the shear rather than the shear cutting out sections approximately $\frac{3}{8}''$ by $\frac{3}{8}''$ wide. Both would fall within the spirit of this invention.

There could be other mechanical changes falling within the spirit of this invention and we do not mean to be limited to exact details as described but only to the broader description as outlined in this specification and claims. As an example the upper cutting member could be attached in an offset position so that assembly of the two handles could be simply by pinning together with the pin as a pivot point rather than the lower cutter sliding through a yoke in the lower handle.

BRIEF DESCRIPTION OF THE DRAWINGS

FIG. 1 shows a side view of an improved hand operated shears.

FIG. 2 shows a side view of the lower cutter 2 attached to a portion of the upper handle 6.

FIG. 3 shows a top view of the upper handle 6 attached to the lower cutter 2.

FIG. 4 shows a top view of the lower handle 7 attached to the upper cutter 1.

FIG. 5 shows the connecting pin to pivotally connect the two handles.

DETAILED DESCRIPTION OF THE DRAWINGS

In FIG. 1 we've shown a side view of one preferred embodiment. Tool steel may be used throughout with cutters of stellite faced steel or other hardened steel. Various steels or combinations of steels for metal cutting are well known to those of ordinary skill in the art.

In FIG. 1 the upper box-like cutter 1 is an integral part of the lower handle 7. The rounded shape of the bottom of the upper cutter 1 is important in that this shape gives solid support when cutting corrugated metal for the lower cutter 2 for the full length of the portion being cut when the lower cutter 2 engages the upper cutter 1. This shape allows improved cutting of corrugated metals while also allowing normal cutting of flat metals. This is a unique feature of the shears.

The total cutter 1 may be hardened steel or the bottom portion which forms the cutting edge of the upper cutter 1 may be faced with a harder steel such as Stellite. The upper cutter 1 may be sharpened by grinding off a small portion of the bottom face to restore the right angle cutting edge.

The lower cutter 2 is sized to cuttably engage the upper cutter 1 and may be made of a suitably hardened steel. This lower cutter 2 may be sharpened by grinding the upper cutting face to restore the right angle cutting edge. The cylindrical connecting post 3 that connects the lower cutter 2 to the upper handle 6 is of particular importance. This post 3 is of cylindrical shape with the diameter of the cylinder being less than the width of the cutter 2. The cylindrical shape allows for the maximum strength post that will move freely in the path of the cutter. The length of the cylindrical post 3 between the point of connection to the lower cutter 2 and the upper handle 6 may be about ⅜ of an inch. With the diameter and length of post 3 as indicated the shears may be turned freely in use because the portion of metal removed by cutter 2 will be wider than the diameter of the post 3. This is another unique feature of the invention. The post 3 also performs a function of limiting the forward travel of the shears to the length of the cutter 2.

In a second embodiment that is not shown the length of the lower cutter 2 may be less than the opening in the upper cutter 1 so that the metal removed rolls ahead of the shears in a strip rather than being cut out in discrete pieces.

The lower cutter 2 and the post 3 may be integrally cast with the upper handle 6. A pin 4 pivotally connects the upper handle 6 to the lower handle 7. A spring 8 biases upper handle 6 and lower handle 7 apart.

In FIG. 2 we've shown a side view of the lower cutter 2 connecting to a portion of the upper handle 6 with the cylindrical post 3. The upper handle contains a hole 5 and flat raised portion 9 making this portion of the upper handle 6 the same width as the lower cutter 2.

In FIG. 3 we've shown a top view of the upper handle 6 attached to the lower cutter 2 indicating that the raised portion 9 of the upper handle 6 is the same width as the cutter 2 while the cylindrical connecting post 3 and the portion of the upper handle 6 between the raised portion 9 and the cylindrical post 3 is slightly narrower than the width of the cutter 2.

In FIG. 4 we've shown a top view of the lower handle 7 attached to the upper cutter 1. The oblong opening 10 with a rounded end forms the upper cutter and connection for the lower handle and is sized so that the lower cutter 2, FIG. 3 and the raised portion 9 of upper handle 6, FIG. 3, fit closely into it. The sides of the oblong opening 10 contains a hole 11 through both sides that is the same diameter as the hole 5, FIG. 3, so that the two handles 6 and 7 may be pivotally connected. This connecting pin 4 is shown in FIG. 1. A connecting post 12 is shown to hold spring 8, FIG. 1, in place. there is a similar post on the upper handle 6, FIG. 1. FIG. 5 shown details of the connecting pin 4.

What is claimed is:

1. An improved hand operated metal shear comprising:
   a. an upper cutter means with two semi-elliptical side cutting edges connected to a frontal cutting edge;
   b. a lower cutter means with straight flat dual cutting edges sized to cuttably pass through said two semi-elliptical side cutting edges and said frontal cutting edge;
   c. a lower handle attached to said upper cutter means;
   d. an upper handle attached to said lower cutter means with a cylindrical post of a smaller diameter than the width of said lowe cutter means;
   e. a pivotal attachment means between said upper handle and said lower handle so positioned that when said upper handle and said lower handle are biased toward each other said lower cutter means will cuttably engage said upper cutter means.

2. An improved hand operated metal shears as in claim 1 where said frontal cutting edge is a semi-circular cutting edge and said lower cutter means is sized to cuttably pass through said semi-circular cutting edge and said side two cutting edges.

3. An improved hand operated shear as in claim 1 where said lower handle is attached to said upper cutter means with a flat yoke forming a rectangular shaped opening with a rounded end with said upper cutter means; said lower cutter means attached to said upper handle fitting through said rectangular opening with a rounded end and said upper handle then being pivotally connected with said lower handle by said pivotal attachment means extending through one side of said rectangular opening, through said upper handle; and then through the other side of said rectangular opening.

4. An improved hand operated shear as in claim 3 where a bottom portion of said upper cutter means is curved and integrally connects with said two semi-elliptical side cutting edges; said lower handle and said upper handle curve upward from said upper cutter means and said lower cutter means respectively and then again curve to be parallel to longer dimension of said upper and said lower cutter means.

5. An improved hand operated metal shear as in claim 1 where a portion of said upper handle connecting to said lower cutter means is narrower in cross section than the width of said lower cutter means and that portion that would be lower than said upper cutter means when said upper cutter means and said lower cutter means are biased up to ¼" apart is said cylindrical post with said cylindrical post diameter being less than the width of said lower cutter means.

6. An improved hand operated metal shear as in claim 5 where a spring is used to bias apart said upper handle and said lower handle.

7. An improved hand operated metal shear comprising:
   a. an upper cutter means with two semi-elliptical side cutting edges connected to a frontal non-cutting edge;
   b. a lower cutter means with straight flat dual cutting edges sized to cuttably pass through said two semi-elliptical side cutting edges of said upper cutter means;
   c. a lower handle curving up to 90 degrees and terminating with a flat sided yoke; each side of said yoke containing a hole and each side being integrally connected at right angles to one of said two semi-elliptical side cutting edges of said upper cutter means;
   d. an upper handle having a first curve of up to 90 degrees and integrally connecting with a flat portion containing a hole; said flat portion having a second curve up to 90 degrees in the same plane and in the reverse direction from said first curve and attaching at a right angle to said lower cutter means with a cylindrical post of lesser diameter than the width of said lower cutter means and of sufficient length to provide a minimum of ¼ inch distance between said upper cutter means and said lower cutter means when said upper handle and said lower handle are biased apart;
   e. a pin for pivotally connecting said upper handle in said yoke of said lower handle through holes contained in said yoke and said upper handle where said lower cutter means cuttably engages said upper cutter means when said metal shear is in use.

8. An improved hand operated metal shear as in claim 7 where said lower cutter means has a straight flat cutting face and is a minimum of ⅛ inch shorter than said two side cutting edges of said upper cutter means.

9. An improved hand operated shear as in claim 8 where said upper handle and said lower handle are biased apart by a spring.

* * * * *